(No Model.)
O. TABER.
THILL COUPLING.
No. 562,936.    Patented June 30, 1896.
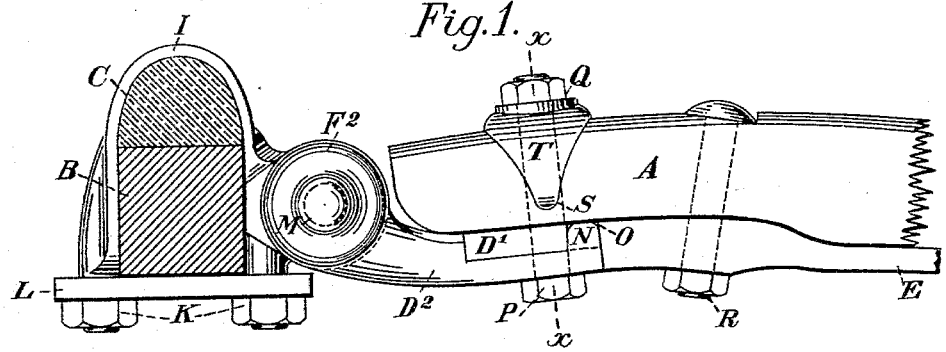
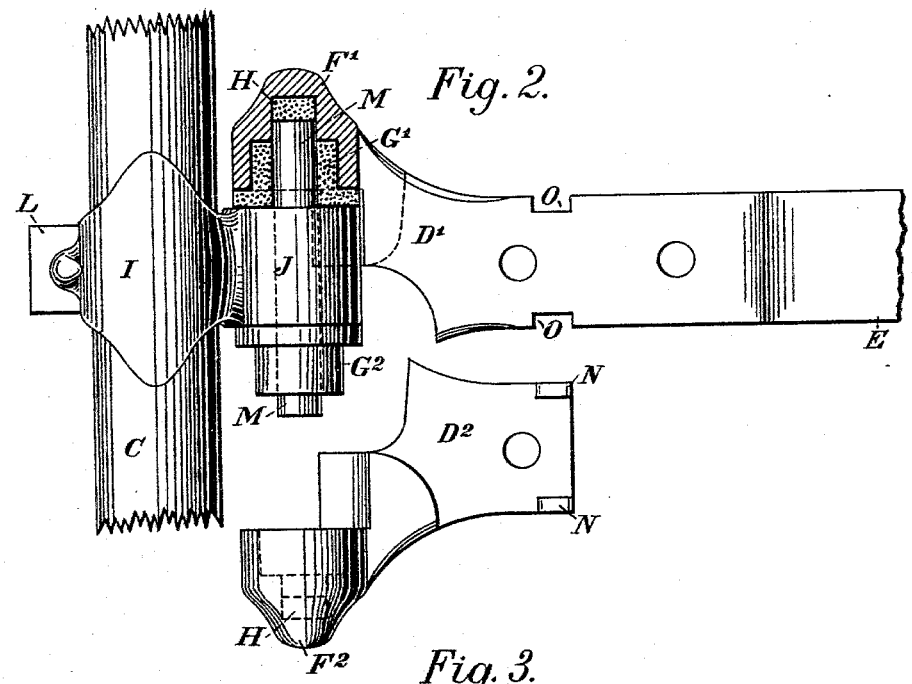
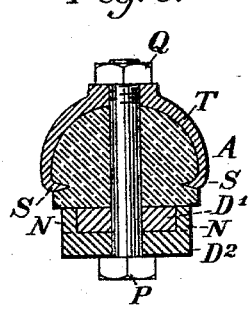
Witnesses:
E. A. Brandau
Wilson D. Bent Jr.
Inventor:
Orrin Taber
John Richards Atty

UNITED STATES PATENT OFFICE.

ORRIN TABER, OF SAN FRANCISCO, CALIFORNIA.

THILL-COUPLING.

SPECIFICATION forming part of Letters Patent No. 562,936, dated June 30, 1896.

Application filed March 21, 1895. Serial No. 542,702. (No model.)

*To all whom it may concern:*

Be it known that I, ORRIN TABER, a citizen of the United States, residing in the city and county of San Francisco, State of California, have invented certain new and useful Improvements in Thill-Couplings; and I hereby declare the following specification and the drawings therewith to be a complete description of my invention and of the manner of constructing and applying the same.

My invention relates to connecting the thills or shafts of vehicles to the axle thereof; and my improvements consist of a housed or inclosed and separable joint consisting of an eye-pin and two bearings or sockets, the latter separable and held by shanks or extensions parting in a horizontal plane or parallel to the axis of the coupling, so as to be held by a single vertical bolt, convenient to remove, these two separable members or bearings provided with bearings or shells of indurated fiber or other like material, having a degree of elasticity and wearing properties, also in various constructive features, as hereinafter set forth, and shown in the drawings.

The objects of my invention are increased strength and security in thill-couplings, convenience in attachment or removal, and in the avoidance of noise or jar in use, also a symmetrical appearance when applied.

Referring to the drawings herewith and forming a part of this specification, Figure 1 represents a side view of one of my improved thill-couplings in place, the vehicle-axle being in section and the shaft or thill in broken view. Fig. 2 is a plan view of the same coupling, partially in section, the shaft being removed and one side of the coupling detached. Fig. 3 is a cross-section on the line $x\,x$ of Fig. 1.

Similar letters of reference on the different figures indicate corresponding parts.

In changing from shafts to poles, and in storing vehicles, it is an object to detach the shafts or poles without in any way interfering with the thill-couplings or their adjustments. The most convenient method of detaching and fastening such joints is by means of a through-bolt with its nut on top and separating the sockets or bearings by means of shanks thereon fitting together horizontally beneath the shafts. Thus arranged, the shafts of a vehicle can be at once removed or replaced by removing a single nut not directly connected with or disturbing in any manner the fit and adjustment of the coupling elements.

In the drawings, A is a section of a shaft or thill, B the metallic, and C the wooden, part of a common axle. The coupling proper consists of the two members $D'\,D^2$, the former being made integral with the strap extension E on the under side of the shaft A. On the members $D'\,D^2$ are formed shell bearings or sockets $F'\,F^2$, bored out to receive the collets $G'\,G^2$, and end-thrust pieces H, made of indurated wood-fiber, celluloid, vulcanite, or other like material having some degree of elasticity and the property of enduring wear under rubbing action.

To the axle B C is fastened an eye J by means of a clip-strip I, having two screw-stems with nuts K and a bearing-bar L in the usual manner, as seen in Fig. 1.

In the eye J is fastened a pin or axis M, which fits loosely in the collets $G'\,G^2$, and bears at each end on the disks or thrust-pieces H, as seen in the section Fig. 2. This pin M abuts firmly against the disks H, so as to prevent side movement or rattle if the collets $G'\,G^2$ should be worn, and in case of wear of the former a new disk can be inserted or packing put beneath the old one, so the pin M will be firmly gripped at its ends.

The two members $D'\,D^2$ are separable, as shown in Fig. 2. The one, $D^2$, underlapping, as seen in Fig. 1, is interlocked by the lugs N, fitting into notches O, and is clamped and firmly held by the through-bolt P, screwed into the clip T, and provided with a jam-nut Q, as shown in Fig. 3, thus combining and holding together the shaft A and the two members $D'\,D^2$. The member $D'$ is further held by a screw-bolt R, passing through the shaft A, as seen in Fig. 1.

The clip T is made with an arc of longer radius than the curved top of the shaft A, and is provided with inward-projecting points S, as seen in Fig. 3, so that when the clip is in place these points S can be driven into the wood, as seen in Fig. 3, the clip T bending accordingly.

To separate the coupling, the screw-bolt P is removed, the lugs N disengaged, and the member $D^2$ drawn away, as seen in Fig. 2.

The other member, D', with the shaft A, is then removable laterally in the same manner.

Having thus described the nature and objects of my invention, with the manner of constructing and applying the same, what I claim as new, and desire to secure by Letters Patent, is—

1. In a thill-coupling, the combination with two separable members forming removable bearings at each side of an eye attached to the axle, a pin passing through said eye and resting in said bearings and bearing shells of elastic or non-resonant material at both sides and ends of the pin, substantially as described.

2. In a thill-coupling, the combination with an axle-clip, eye, and fixed pin therein, separable bearings at each side parted in a horizontal plane and held together by interlocking lugs and a through-bolt, and bearing shells of elastic material at both sides and ends of the pin, substantially as described.

3. In a thill-coupling, the combination with an axle-clip, eye, and fixed pin therein, separable bearings at each side and held together by interlocking lugs and a through-bolt, one bearing formed integral with the strap extension attached to the shaft and the other having a shank to fit beneath the shaft-iron as described, sound-deadening bearing-shells in said bearings, the former to embrace the pin and the latter to receive the abutting ends thereof.

4. In a thill-coupling, the combination with two separable members provided with sockets, sound-deadening bearing-shells in said sockets, an axle-clip, eye and fixed pin therein, said sockets forming journals for said pin, and a clip embracing the shaft and having a bolt passing therethrough to lock the members securely to the shaft.

In testimony whereof I have hereunto affixed my signature in the presence of two witnesses.

ORRIN TABER.

Witnesses:
T. M. McNAMARA,
F. E. BINGHAM.